Figure 1:
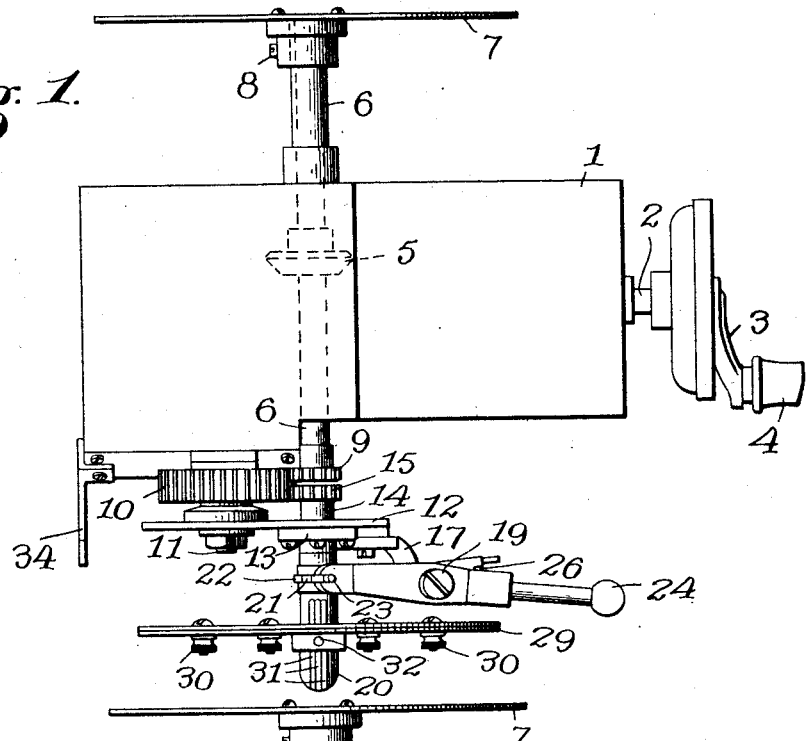

T. H. BLAIR.
MOVING PICTURE MACHINE.
APPLICATION FILED JULY 3, 1913.

1,188,612.

Patented June 27, 1916.
2 SHEETS—SHEET 1.

Witnesses.
R. D. Tolman.
Penelope Cumberbach

Inventor
Thomas H. Blair.
By Rufus B Fowler
Attorney

T. H. BLAIR.
MOVING PICTURE MACHINE.
APPLICATION FILED JULY 3, 1913.
1,188,612.
Patented June 27, 1916.
2 SHEETS—SHEET 2.
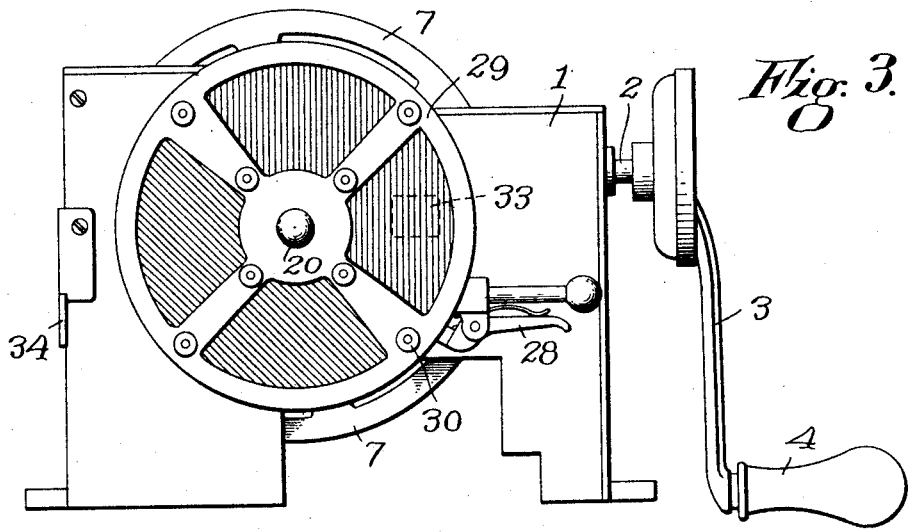
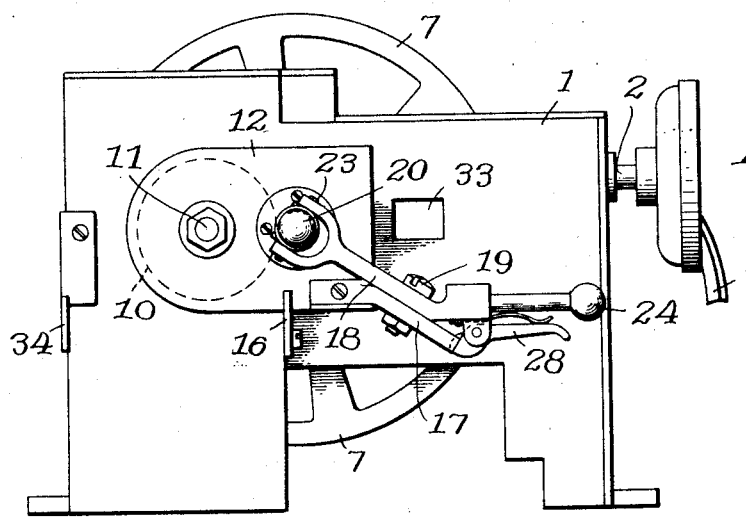
Witnesses
R. D. Tolman.
Penelope Cumberbatch.
Inventor
Thomas H. Blair.
By Rufus B. Fowler
Attorney

UNITED STATES PATENT OFFICE.

THOMAS H. BLAIR, OF NORTHBORO, MASSACHUSETTS.

MOVING-PICTURE MACHINE.

1,188,612.  Specification of Letters Patent.  Patented June 27, 1916.

Application filed July 3, 1913. Serial No. 777,198.

*To all whom it may concern:*

Be it known that I, THOMAS H. BLAIR, a citizen of the United States, residing at Northboro, in the county of Worcester and Commonwealth of Massachusetts, have invented a new and useful Improvement in Moving-Picture Machines, of which the following, together with the accompanying drawings, is a specification.

My invention relates to moving picture machines and more particularly to a motion picture machine including an improved form of mechanism for interposing differently colored transparent screens successively in the path of the light while the pictures are being projected.

In the operation of motion picture machines, as is well known, a transparent photographic film containing a large number of small images or pictures representing a moving object or scene at successive periods of time is passed through the machine between the source of light and a lens. A moving picture machine of the class to which the present invention belongs includes a plurality of differently colored screens or a screen having a plurality of differently colored sections movable successively into and out of the path of the light passing through the film so that the projected picture may appear substantially in its natural colors. In practice a screen having a red section and a green section is common, these being the colors which give the most desirable effect. A film designed for use in such a machine has the first picture thereon and every alternate picture thereafter opaque or semi-opaque throughout the portions thereof upon which are represented objects, or parts of a scene which it is desired should appear in one of the colors of the color screen. The remaining portions of these alternate pictures appearing upon the film have the proper normal intensity of the film so as to allow the light to pass therethrough. The movement of the color screen or screens is such as to interpose the proper color in the path of the light while these alternate pictures upon the film are being projected. The remaining pictures upon the film have those portions opaque or semi-opaque which were normal in the first mentioned alternate pictures and those portions normal which were opaque or semi-opaque in the first mentioned alternate pictures. The other differently colored portion of the color screen is interposed in the path of the light while these latter pictures are being projected. The red objects are, therefore, projected in alternation with the green objects and the resultant effect is a blend of the two into a complete colored motion picture.

It is obvious that the motion imparted to the color screen must correspond properly with the motion of the picture film so that each colored portion of the screen may be interposed in the path of the light in register with the proper picture on the film and not in register with those pictures designed to receive light through the other portion of the screen. In practice, it is often found that the pictures on the film, as the film is being passed through the machine, are not in proper register with the corresponding portions of the color screen; and, in case it is found after the film has been started that the pictures do not register properly with the respective portions of the color screen, it is then necessary to stop the machine and readjust the position of the color screen or else readjust the position of the film relatively thereto.

One object of the invention is to overcome this objection by providing means for quickly reversing or adjusting the relative positions of the differently colored portions of the color screen either while the machine is at rest or while the machine and the film are in motion and the pictures are being projected.

It frequently happens that it is desired to project a portion of the pictures of a film in colors and other portions thereof, as usual, in black and white, or vice versa.

Another object of the invention, therefore, is to provide mechanism for operating the color screen, so constructed that the screen may be quickly moved into and out of the path of the light either while the machine is at rest or while it is in motion and a motion picture is being projected.

Other objects and advantages will appear from the following description taken in connection with the accompanying drawings, in which—

Figure 2:
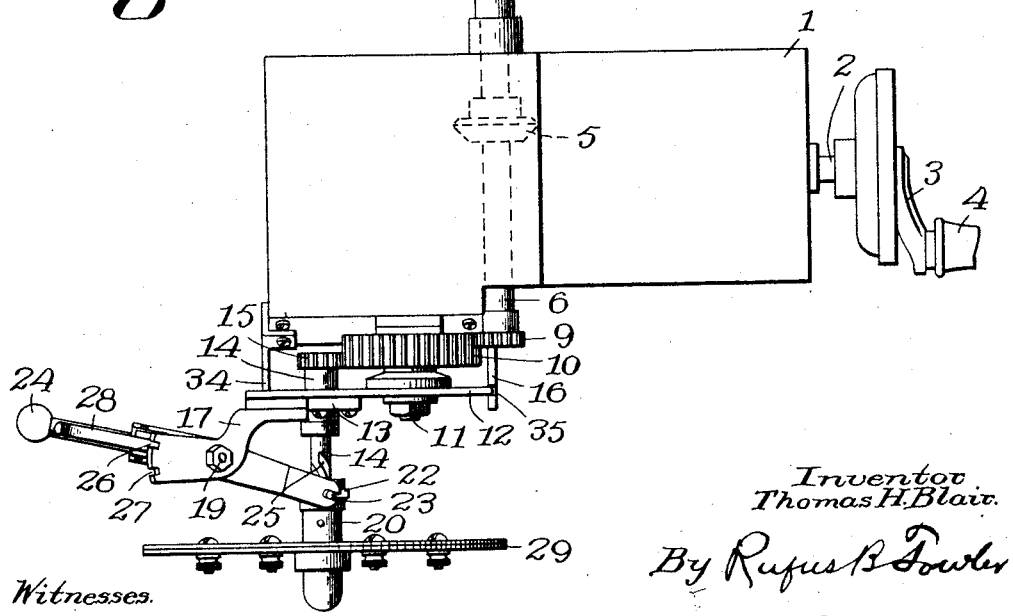

Figure 1 is a plan view of a moving picture machine constructed in accordance with my invention, the color screen being shown in operative position; Fig. 2 is a view similar to that shown in Fig. 1, but with the color screen shown in inoperative position; Fig. 3 is a rear view of the machine; and Fig. 4 is a view similar to that shown in Fig. 3, but with the color screen removed.

Like reference characters refer to similar parts in the different figures.

In the form of the invention shown in the drawings the machine includes a casing or housing 1 for the protection and support of certain of the mechanism for imparting intermittent motion to the film. This film operating mechanism, however, forms no part of the present invention and its illustration and description are, therefore, not deemed necessary.

A main driving shaft 2 provided with a crank 3 and a handle 4 serves to actuate the various moving elements of the machine. This driving shaft 2 is operatively connected by any suitable driving mechanism, including the bevel gear 5, with a second shaft 6 carrying the shutter 7 at its forward end. The shutter 7 is secured to the shaft 6 by a set screw 8 so that it may be adjusted about the shaft to register properly with the pictures on the film. The rear end of the shaft 6 carries a small pinion 9 in mesh with a gear wheel 10 rotatably supported upon a fixed pivot or stud 11 parallel with the shaft 6. A flat plate 12 is pivoted near one end upon the stud 11 and in a plane at right angles to the axis thereof. Secured to this plate 12 is a bearing 13 in which turns a short shaft 14, the shaft 14 being formed with shoulders on opposite sides of its bearing to prevent longitudinal displacement thereof. A second small pinion 15 is carried upon the inner end of the shaft 14, this pinion 15 being of the same size and having the same number of teeth as the pinion 9. The distance between the axes of the stud 11 and the shaft 14 is equal to the distance between the axes of the stud 11 and the shaft 6 so that the pinion 15 meshes with the gear wheel 10 in whatever position it may be given by rotation of the plate 12 about the stud 11. The face of the idle gear wheel 10 is broad enough to engage the faces of both the pinions 9 and 15 so that, as the shaft 6 is rotated by the main driving shaft 2, it will drive the shutter 7 and the shaft 14 at the same speed. A fixed stop 16 secured to the casing 1 serves to limit the motion of the plate 12 in one direction about its supporting stud 11 so that, when the lower edge of the plate 12 is brought firmly against the stop 16, the shafts 6 and 14 will be exactly in alinement. With the plate 12 in this position, therefore, the effect is the same as though the shafts 6 and 14 were joined into one integral shaft.

The end of the plate 12 opposite the stud 11 carries a rigid offset arm 17 to which the center of the lever 18 is pivotally attached by a bolt 19. The outer or rear end of the shaft 14 is surrounded by a sleeve 20 provided with a peripheral groove 21 which receives a U-shaped member 22 having pins or projections 23 extending in a line through the axis of the sleeve 20 and at right angles to the adjacent or inner arm of the lever 18. This inner arm of the lever 18 is U-shaped and extends on both sides of the sleeve 20, each of its terminals being slotted to engage one of the pins or projections 23. The outer end of the lever 18 is extended into a handle 24. By turning the lever 18 about its pivot 19, the sleeve 20 is moved longitudinally upon the shaft 14 and it is obvious that this longitudinal motion of the sleeve 20 may be imparted to it even while the shaft 14 is rotated, the sleeve 20 being free to turn at all times in the U-shaped member 22 which engages it and determines its longitudinal position. The shaft 14 is provided with screw threads 25 which engage coöperating screw threads inside the sleeve 20 so that, as the sleeve 20 is moved longitudinally on the shaft 14 by the lever 18, it will be given also a definite and predetermined rotative motion relatively to the shaft 14. The outer end of the arm or support 17 is provided with a pair of notches 26 and 27, and a spring pressed latch 28 carried by the outer arm of the lever 18 engages one or the other of these notches to hold the sleeve 20 in one or the other of two extreme positions. The pitch of the threads 25 on the shaft 14 and the coöperating threads inside the sleeve 20 are such that the sleeve 20 is given one half of a complete revolution relatively to the shaft 14 when it is moved from one to the other of its extreme positions determined by the notches 26 and 27.

Mounted upon the sleeve 20 is a color screen 29, the plane of this color screen being at right angles to the axis of the sleeve 20 and, therefore, parallel to the plane of the shutter 7 and, when the plate 12 is in engagement with the stop 16, the axes of the shutter 7 and the color screen 29 coincide. The color screen 29 is divided into differently colored sections and, as indicated in Fig. 3, a common and desirable arrangement of such sections is provided by making one half the color screen green and the other half red. Transparent colored celluloid may be used in the colored sections of the screen and the frame of the screen may be constructed of a pair of skeleton plates between which the colored sections may be clamped by small bolts 30, as shown. The sleeve 20 has a series of longitudinal grooves 31 for engagement by the set screw 32 of the color screen 29 so that the color screen may be adjusted about the sleeve and secured rigidly thereto in adjusted position.

By means of the described construction it is now clear that the color screen will rotate with the shutter 7 and at the same speed and that, if the colored sections of the color screen are reversed with relation to the pictures upon the film as it passes through the machine, the color screen may be rotated by the lever 18 through one half a complete revolution relatively to the shaft 14 and, therefore, to the shutter 7 and the pictures upon the film so as to bring it into proper registration and coöperation with the pictures upon the film. The path of the film, of course, passes through the space between the shutter 7 and the color screen 29, an opening 33 being provided through the casing to permit the light to pass through the color screen, the pictures on the film and the openings in the shutter 7.

As has been already stated, it is sometimes desirable to discontinue the use of the color screen or to place it in service after the machine has been in operation without it. In attaining this object, the plate 12 carrying the shaft 14 and the color screen 29 is rotated about its supporting stud 11 to carry the color screen either into or out of the path of the light. A second stop 34, secured to the casing 1, serves to hold the plate 12 with the color screen 29 in convenient position out of the path of the light, as shown in Fig. 2. Rotation of the plate 12 in either direction may be effected by means of the handle 24 of the lever 18. The stop 16 is formed with a narrow notch 35 to receive the lower edge of the plate 12 as it approaches this stop, the width of the notch being such as to have binding engagement with the plate and thus hold it by friction firmly against its seat on the stop in the position shown in Figs. 1 and 4. Rotation of the plate 12 takes place about the axis of the stud 11 and, therefore, about the axis of the gear wheel 10 so that, as the plate rotates, the pinion 15 merely rolls along the periphery of the gear wheel. Therefore, the plate 12 may be rotated to carry the color screen out of the path of the light and then reversely rotate it to carry the color screen back into the path of the light, the color screen being brought back into the same registration with the shutter 7 and with the pictures on the film at the end of these movements as it had at the beginning.

While I have shown and described the details of one form of my invention, I do not wish to be limited to such details as certain changes may be made without departing from the spirit of the invention; but Having described my invention, what I claim as new and desire to secure by Letters Patent is:

1. In a machine of the class described, a rotatable shutter, a color screen rotatable in synchronism with said shutter and disposed in normal operative position in axial alinement therewith, and means for moving said color screen out of axial alinement with said shutter.

2. In a machine of the class described, a color screen, means for rotating said screen, and means for bodily shifting said screen in a plane at an angle to its axis of rotation to carry it into inoperative position with respect to the shutter of the machine.

3. In a machine of the class described, a shaft, a color screen mounted upon the shaft, a support for the shaft and screen, and means for driving the shaft and screen, the support being adjustably mounted to allow the color screen to be moved into and out of the path of the light, substantially as described.

4. In a machine of the class described, a shutter, a pinion rotatable with the shutter, an idle gear wheel in mesh with said pinion, a shaft parallel with the axis of the pinion, a second pinion on the shaft and in mesh with the gear wheel, and a color screen mounted on the shaft, the shaft being mounted to revolve about the axis of the gear wheel to carry the color screen into and out of the path of the light.

5. In a machine of the class described, a shutter, a pinion rotatable with the shutter, a shaft carrying a color screen and a second pinion, a gear connection between the two pinions, and a support for the shaft, the support being adjustable to carry the color screen into and out of the path of the light.

6. In a machine of the class described, a shutter, a pinion rotatable with the shutter, a shaft parallel with the axis of the pinion and carrying a color screen and a second pinion, a gear connection between the two pinions, a support for the shaft, the support being adjustable to carry the color screen into and out of the path of the light, and a stop to hold the axes of the shaft and the first mentioned pinion in alinement.

7. In a machine of the class described, a shutter, a pinion rotatable with the shutter, a shaft normally in alinement with the axis of the pinion, an operative connection between the pinion and the shaft, a color screen mounted on the shaft, and an adjustable support for the shaft to carry it out of alinement with the pinion.

8. In a machine of the class described, a shaft, a shutter carried by said shaft, a second shaft in alinement with said first shaft, a geared connection between said shafts, a sleeve inclosing said second shaft, a color screen mounted on said sleeve, means for imparting the motion of said second shaft to said sleeve, and means for rotatively adjusting said sleeve on said second shaft.

9. In a machine of the class described, a rotatable color screen comprising sections of different colors, means for moving a film past said screen in synchronism with the revolutions of the screen, and means for causing a predetermined relative angular movement between said screen and its axis of rotation during the operation of the machine, in order to interchange the position of the several color sections with relation to the successive images on the film.

10. In a machine of the class described, a rotatable shutter having a plurality of apertures, a color screen comprising sections of different colors, rotatable in synchronism with said shutter, and means for causing a predetermined relative angular movement between said shutter and said color screen during the operation of the machine, in order to interchange the positions of the several screen sections with respect to the apertures of the shutter.

11. In a machine of the class described, a rotatable color screen comprising two sections of independent color values, means for moving a film past said screen in synchronism with the revolutions of said screen, the images on said film having alternate independent color values corresponding to the color values of the two color screen sections, and means for causing a predetermined relative angular movement between said screen and its axis of rotation during the operation of the machine, in order to interchange the positions of the screen sections with relation to the successive images on the film.

12. In a machine of the class described, a color screen supported thereby, means for rotating the color screen relatively to the shaft, and means for moving the shaft to carry the color screen into and out of the path of the light.

13. In a machine of the class described, a shaft, a color screen supported on said shaft, a pivoted support for said shaft, means for limiting the movement of said support on its pivot, means for rotatively adjusting said color screen on said shaft, and means carried by said pivoted support for locking the color screen in its adjusted position.

THOMAS H. BLAIR.

Witnesses:
PENELOPE COMBERBACH,
NELLIE WHALEN.

Copies of this patent may be obtained for five cents each, by addressing the "Commissioner of Patents, Washington, D. C."